(12) United States Patent
Tsui (10) Patent No.: US 8,976,948 B2
(45) Date of Patent: Mar. 10, 2015

(54) METHOD AND COMMUNICATION DEVICE FOR DISPLAYING CALLER INFORMATION AND RECORDING MEDIUM

(75) Inventor: Yuan-Mao Tsui, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 794 days.

(21) Appl. No.: 12/624,423

(22) Filed: Nov. 24, 2009

(65) Prior Publication Data

US 2010/0208876 A1 Aug. 19, 2010

(30) Foreign Application Priority Data

Feb. 13, 2009 (TW) .............................. 98104653 A (51) Int. Cl.
*H04M 1/56* (2006.01)
*H04M 1/2745* (2006.01)
*H04M 3/42* (2006.01)

(52) U.S. Cl.
CPC ...... *H04M 1/27455* (2013.01); *H04M 2250/22* (2013.01)
USPC .................................. 379/142.06; 455/414.1

(58) Field of Classification Search
CPC ..... H04W 12/06; H04W 60/00; H04W 74/00; H04W 88/08; H04W 88/16; H04W 92/02
USPC ............................... 379/88.19–88.21, 142.06
See application file for complete search history.

(56) References Cited

U.S. PATENT DOCUMENTS

| 7,512,400 | B2 * | 3/2009 | Starbuck et al. ........... 455/414.1 |
| 2004/0209607 | A1 | 10/2004 | Stepanich et al. | |
| 2005/0232247 | A1 * | 10/2005 | Whitley et al. ............... 370/352 |
| 2005/0261034 | A1 * | 11/2005 | Punaganti et al. ............ 455/567 |
| 2007/0242809 | A1 * | 10/2007 | Mousseau et al. ......... 379/88.18 |
| 2008/0152097 | A1 * | 6/2008 | Kent .......................... 379/93.01 |

(Continued)

FOREIGN PATENT DOCUMENTS

CN 1725785 1/2006

OTHER PUBLICATIONS

"Office Action of Europe Counterpart Application", issued on Nov. 6, 2012, p. 1-p. 4.
"Second Office Action of China counterpart application" issued on Nov. 26, 2012, p. 1-p. 7, in which CN1725785 was cited.
"1st Office Action of European Counterpart Application", issued on Apr. 15, 2010, p. 1-p. 4.

(Continued)

*Primary Examiner* — Fan Tsang
*Assistant Examiner* — Solomon Bezuayehu
(74) *Attorney, Agent, or Firm* — Jianq Chyun IP Office (57) ABSTRACT

A method, a communication device and a computer program product for displaying caller information are provided. In the present method, when the communication device is in a communication mode, a user interface of the communication mode is displayed, wherein the user interface comprises at least one on-screen button having caller information displaying function. Then, a selecting operation performed on one of the on-screen buttons by a user of the communication device is received, the caller information associated with a caller is retrieved according to the selected on-screen button, and the retrieved caller information is displayed. Thereby, in the present application, the user of the communication device can obtain information about the caller at the same time when the user is communicating with the caller, and accordingly communication is made more convenient.

20 Claims, 8 Drawing Sheets

(56) References Cited

U.S. PATENT DOCUMENTS

2008/0168379 A1* 7/2008 Forstall et al. ............... 715/778
2008/0240411 A1* 10/2008 Dasgupta ................ 379/373.04
2009/0013059 A1 1/2009 Partaker et al.
2009/0086939 A1* 4/2009 Chatterjee ................. 379/93.03
2010/0203874 A1* 8/2010 Scott et al. .................... 455/415

OTHER PUBLICATIONS

"Search Report of European Counterpart Application", issued on Mar. 15, 2010, p1-p3.
"Office Action of Europe Counterpart Application", issued on Febuary 17, 2014, p. 1-p. 3.

* cited by examiner

METHOD AND COMMUNICATION DEVICE FOR DISPLAYING CALLER INFORMATION AND RECORDING MEDIUM

CROSS-REFERENCE TO RELATED APPLICATION

This application claims the priority benefit of Taiwan application serial No. 98104653, filed on Feb. 13, 2009. The entirety of the above-mentioned patent application is hereby incorporated by reference herein and made a part of this specification.

BACKGROUND

Generally speaking, when a user uses a communication device to make a phone call, a user interface of the communication mode is displayed on the screen of the communication device. The content of this user interface comprises different communication information, such as name, phone number, photo of caller, or duration of call. Such communication information allows a user of the communication device to identify the caller or inspect whether the conversation has been carried for too long.

However, when a user is making a phone call, the user may need to know other information related to the caller besides aforementioned personal information. For example, when the user is discussing a specific project with the caller, if the caller indicates that he/she has forwarded a related e-mail to the user and requests the user to check his/her e-mail inbox, the user has to hang up the phone call before he/she can go online to check the e-mail sent by the caller by using the communication device. It is impossible for the user to check the e-mail at the same time when the user is communicating with the caller. As a result, the project cannot be completely discussed by making a single phone call, and which makes the communication very inconvenient.

SUMMARY

Accordingly, the present application is directed to a method for displaying caller information, wherein when a user of a communication device is making a phone call, at least one on-screen button corresponding to a caller information displaying function is displayed such that the user can obtain related information of the caller without hanging up the phone call.

The present application is directed to a method for displaying caller information, wherein the method is suitable for a communication device. In the present method, when the communication device is in a communication mode, a user interface of the communication mode is displayed on a screen of the communication device, wherein the user interface comprises at least one on-screen button corresponding to a caller information displaying function. Then, a selecting operation performed on one of the on-screen buttons is received from a user of the communication device, caller information associated with a caller is retrieved according to the selected on-screen button, and the retrieved caller information is displayed.

According to an example of the present application, the step of displaying the user interface when the communication device is in the communication mode comprises displaying the user interface when the communication device receives an incoming call answering operation and accordingly enters the communication mode, or displaying the user interface when the communication device is used to make a call or when a call made by the communication device is answered and accordingly the communication device enters the communication mode.

According to an example of the present application, the step of retrieving the caller information according to the selected on-screen button comprises identifying the caller to generate identification information and then retrieving the caller information associated with the caller in the communication device according to the identification information, wherein the identification information comprises a phone number of the caller.

The present application provides a communication device comprising a display unit, an input unit, a communication unit, a user interface displaying module, and a caller information retrieving module. The input unit receives operations from a user. The communication unit, coupled to the input unit, establishes a communication to allow the communication device to enter a communication mode when the input unit receives a communication operation. The user interface displaying module, coupled to the display unit and the communication unit, displays a user interface on the display unit when the communication unit is in the communication mode, wherein the user interface comprises at least one on-screen button corresponding to a caller information displaying function. When the input unit receives a selecting operation performed on one of the on-screen buttons, the caller information retrieving module, coupled to the input unit and the user interface displaying module, retrieves caller information associated with a caller according to the selected on-screen button, and the user interface displaying module displays the caller information on the display unit.

According to an example of the present application, the communication device further comprises a storage unit for recording caller information. The caller information retrieving module identifies the caller to generate identification information of the caller and retrieves the caller information in the storage unit according to the identification information, wherein the identification information comprises a phone number of the caller.

According to an example of the present application, the caller information comprises one of personal information, a short message list, an e-mail list, social information, and a call history of the caller, or a combination thereof.

According to an example of the present application, the personal information comprises a name, a cell phone number, a home phone number, a work phone number, an address, a company name, a photo, an e-mail address, a birthday, a personal website link, or a combination thereof.

According to an example of the present application, the e-mail list comprises e-mails of all e-mail accounts of the caller.

According to an example of the present application, the social information comprises Facebook updates, Facebook events, website updates, album updates, birthday reminders, anniversary reminders, or a combination thereof.

According to an example of the present application, the input unit comprises a keyboard, a mouse, a touch pad, or a touch screen, and the communication unit comprises a Global System for Mobile Communication (GSM) device, a Personal Handy-phone System (PHS) device, a Wireless fidelity (Wi-Fi) device, a Worldwide Interoperability for Microwave Access (WiMAX) device, or a combination of foregoing devices.

According to an example of the present application, the communication device comprises a cell phone, a smart phone, a personal digital assistant (PDA) phone, or an in-vehicle computer.

The present application further provides a recording medium which records a computer program to be loaded into a mobile device to execute following steps. First, when the communication device is in a communication mode, a user interface is displayed on a screen, wherein the user interface comprises at least one on-screen button corresponding to a caller information displaying function. Then, a selecting operation performed on one of the on-screen buttons by a user of the communication device is received, caller information associated with a caller is retrieved according to the selected on-screen button, and the retrieved caller information is displayed.

As described above, the present application provides caller information displaying method, a communication device, and a computer program product, wherein when a user is making a phone call, at least one on-screen button corresponding to a caller information displaying function is displayed on the screen, and when a selecting operation is received from the user, the caller information associated with a caller is retrieved and displayed according to an identification information of the caller. Thereby, the user of the communication device can obtain desired caller information at the same time when the user is making a phone call, so that communication is made very convenient.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DESCRIPTION

Reference will now be made in detail to the present preferred examples of the application, examples of which are illustrated in the accompanying drawings. Wherever possible, the same reference numbers are used in the drawings and the description to refer to the same or like parts.

In the present application, at least one on-screen button for displaying different types of caller information is disposed in a user interface when a communication device is in a communication mode, so that the on-screen buttons can be selected by a user of the communication device when the user is making a phone call. When the user selects one of the on-screen buttons, the communication device retrieves information (for example, personal information, short messages, e-mails, social information, or a call history) associated with a caller according to the phone number or other identification information of the caller and displays the caller information on the screen. Accordingly, even when the user is making a phone call, the user can still obtain information associated with the caller or data sent by the caller instantly. Thereby, communication is made very convenient.

Figure 1:
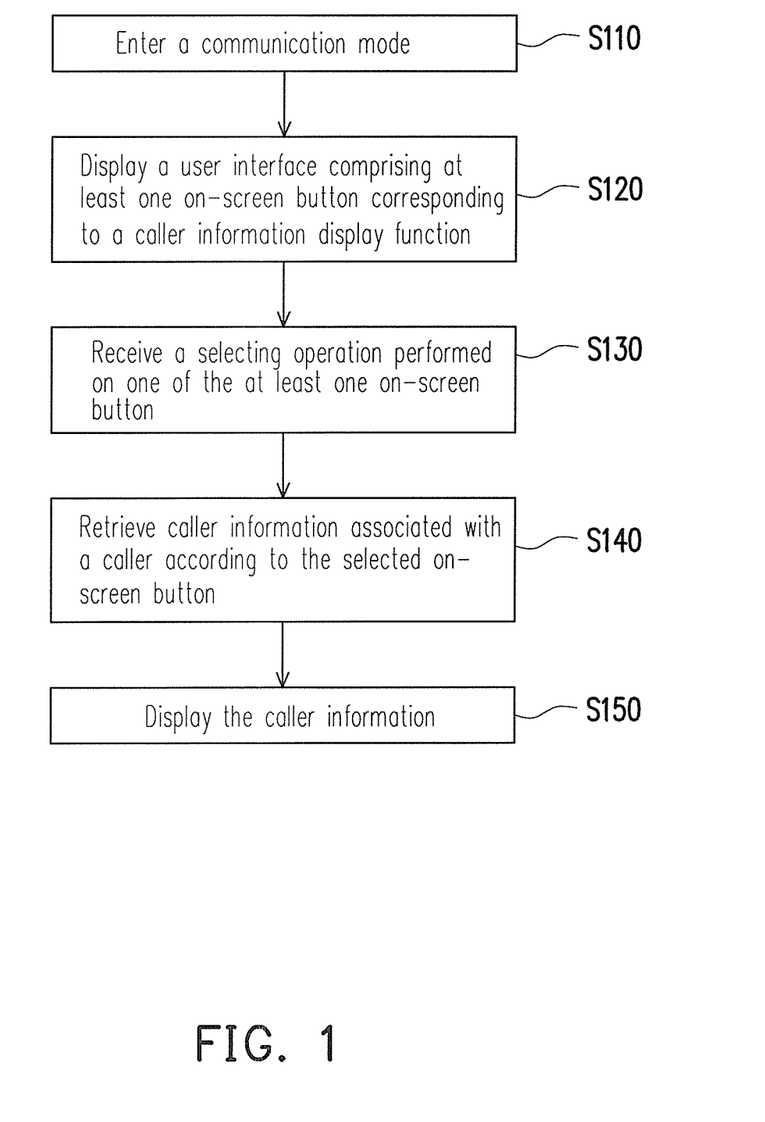
FIG. 1 is a flowchart of a method for displaying caller information according to an example of the present application.

FIG. 1 is a flowchart of a caller information displaying method according to an example of the present application. Referring to FIG. 1, the method in the present example is suitable for a communication device, such as a cell phone, a smart phone, a personal digital assistant (PDA) phone, or an in-vehicle computer. The steps in the present method will be described in detail below.

First, when a user of the communication device receives an incoming call or makes a phone call by using the communication device, the communication device enters a communication mode (S110). To be specific, the communication device is in the communication mode when the communication device receives an incoming call and an incoming call answering operation from a user. The aforementioned incoming call answering operation may refer to the action of clicking at a touch button displayed on a touch screen or a hardware button disposed on the communication device. However, the present application is not limited thereto. On the other hand, the communication device makes a phone call when it receives a call dialling operation from the user and enters the communication mode when the phone call is made or answered by the other party. The aforementioned call dialling operation may refer to the action of clicking at a touch button displayed in a touch screen or a hardware button disposed on the communication device. However, the present application is not limited thereto.

After the communication device enters the communication mode, it displays a user interface on the screen, wherein the user interface has at least one on-screen button corresponding to a caller information displaying function (S120).

The on-screen buttons are respectively corresponding to a different caller information, such as a personal information, a short message list, an e-mail list, a social information, or a call history of the caller. The personal information comprises a name, a cell phone number, a home phone number, a work phone number, an address, a company name, a photo, an e-mail address, a birthday, or a personal website link of the caller. The short message list comprises all the short messages sent by the caller and all the short messages sent by the user to the caller or all the short messaged sent by the caller, wherein the short message list may be the short messaging service (SMS), the multimedia messaging service (MMS), or both of the two. The e-mail list comprises all the e-mails of one or all the e-mails accounts of the caller or all the e-mails sent between the caller and the user. The social information comprises Facebook updates, Facebook events, website updates, album updates, birthday reminders, and anniversary reminders.

When the communication device receives a selecting operation performed on one of the on-screen buttons (S130), the communication device retrieves caller information associated with a caller according to the selected on-screen button (S140) and displays the retrieved caller information on the screen of the communication device (S150). To be specific, after the communication device receives the selecting operation from the user, it first identifies a phone number or other identification information of the caller and then retrieves the caller information associated with the caller according to the identification information.

Figure 2:
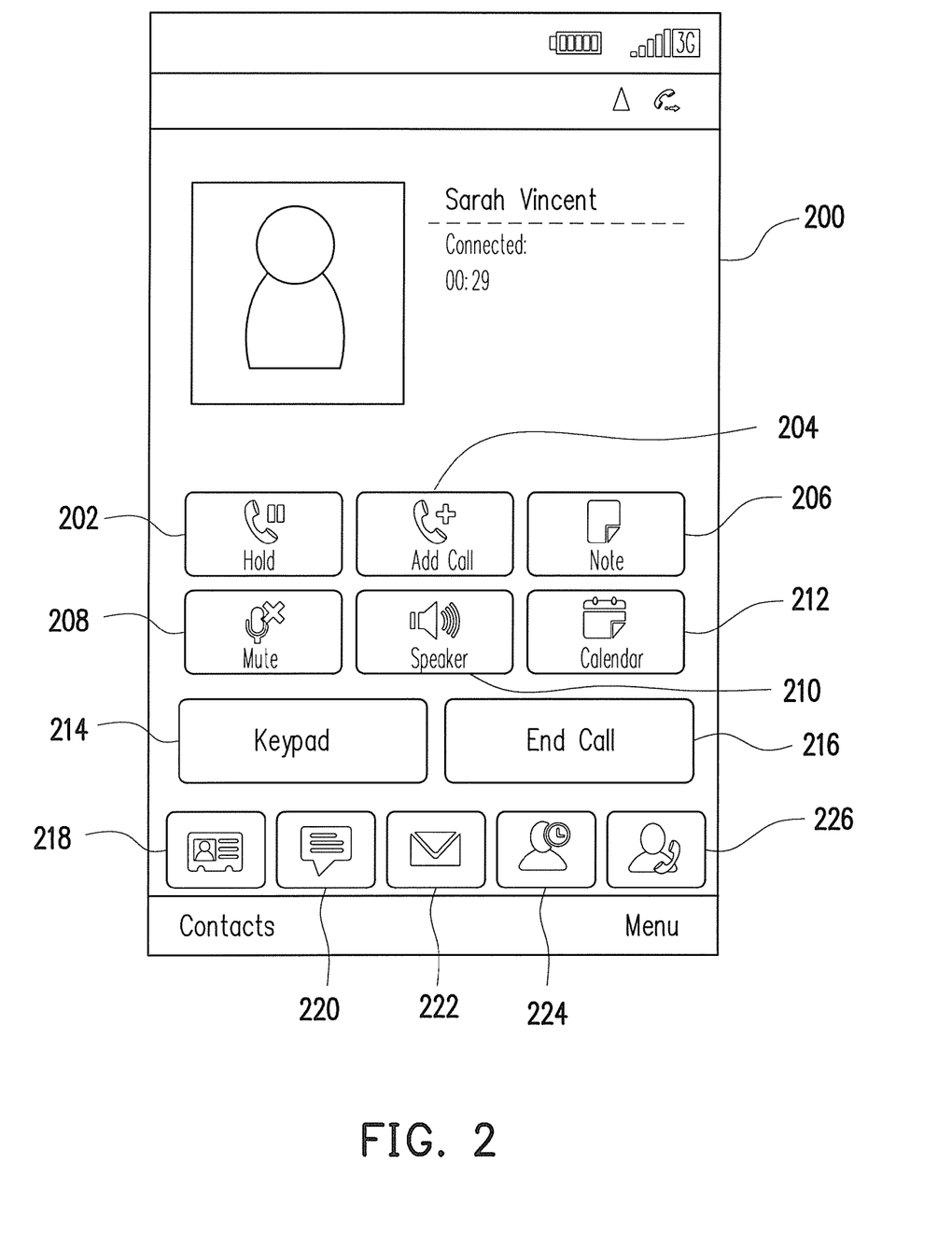
FIG. 2 illustrates an example of a user interface in a communication mode according to an example of the present application.

FIG. 2, FIG. 3, FIG. 4, FIG. 5, FIG. 6, and FIG. 7 respectively illustrate an example of the caller information displaying method according to an example of the present application. Referring to FIG. 2 first, in the present example, the user interface 200 is a user interface displayed when a communication device is in a communication mode. The upper portion of the user interface 200 displays the name (for example, Sarah Vincent), photo, and call duration of a caller, and the lower portion thereof displays some basic function buttons, such as a "Hold" button 202, an "Add Call" button 204, a "Note" button 206, a "Mute" button 208, a "Speaker" button 210, a "Calendar" button 212, a "Keypad" button 214, and an "End Call" button 216.

Besides aforementioned basic function buttons, the communication device in the present example further displays some on-screen buttons in the user interface 200, such as a "Details" button 218, a "Messages" button 220, an "Email" button 222, an "Updates and Events" button 224, and a "Call History" button 226. The "Details" button 218 corresponds to a function for displaying the personal information of the caller, the "Messages" button 220 corresponds to a function for displaying short messages sent or received by the caller, the "Email" button 222 corresponds to a function for displaying e-mails sent or received by the caller, the "Updates and Events" button 224 corresponds to a function for displaying social information of the caller, and the "Call History" button 226 corresponds to a function for displaying previous calls made between the user and the caller.

Figure 3:
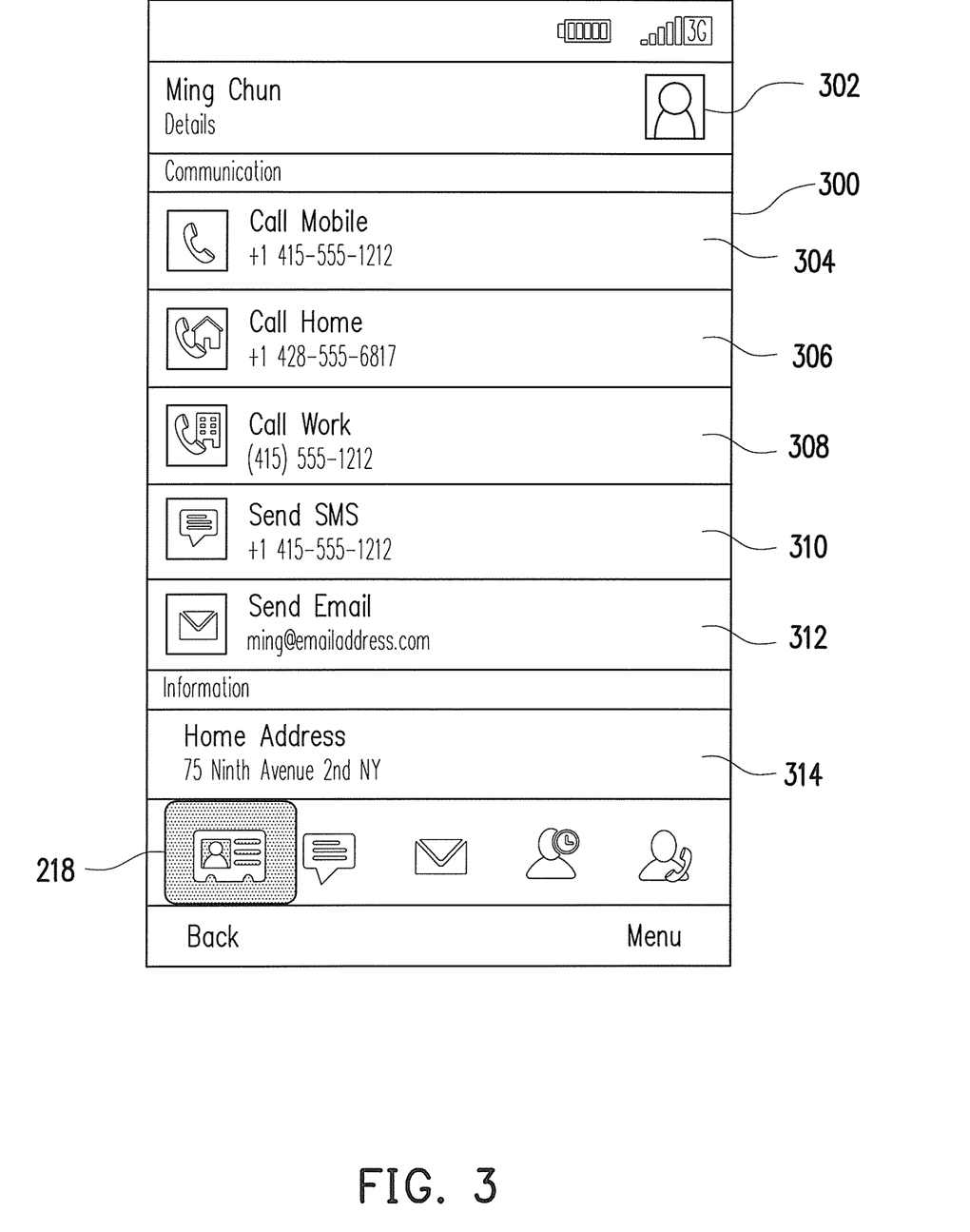
FIG. 3 illustrates an example of a personal information display interface according to an example of the present application.

To be specific, when the user clicks the "Details" button 218 in the user interface 200, the communication device displays a user interface 300 as shown in FIG. 3. The user interface 300 displays the name (Ming Chin) of the caller, a photo 302, a cell phone number (Call Mobile) 304, a home phone number (Call Home) 306, a work phone number (Call Work) 308, a short message number (Send SMS) 310, and an e-mail address (Send Email) 312. Besides, the user interface 300 further displays other personal information of the caller, such as an address 314, or a personal website link (not shown).

Figure 4:
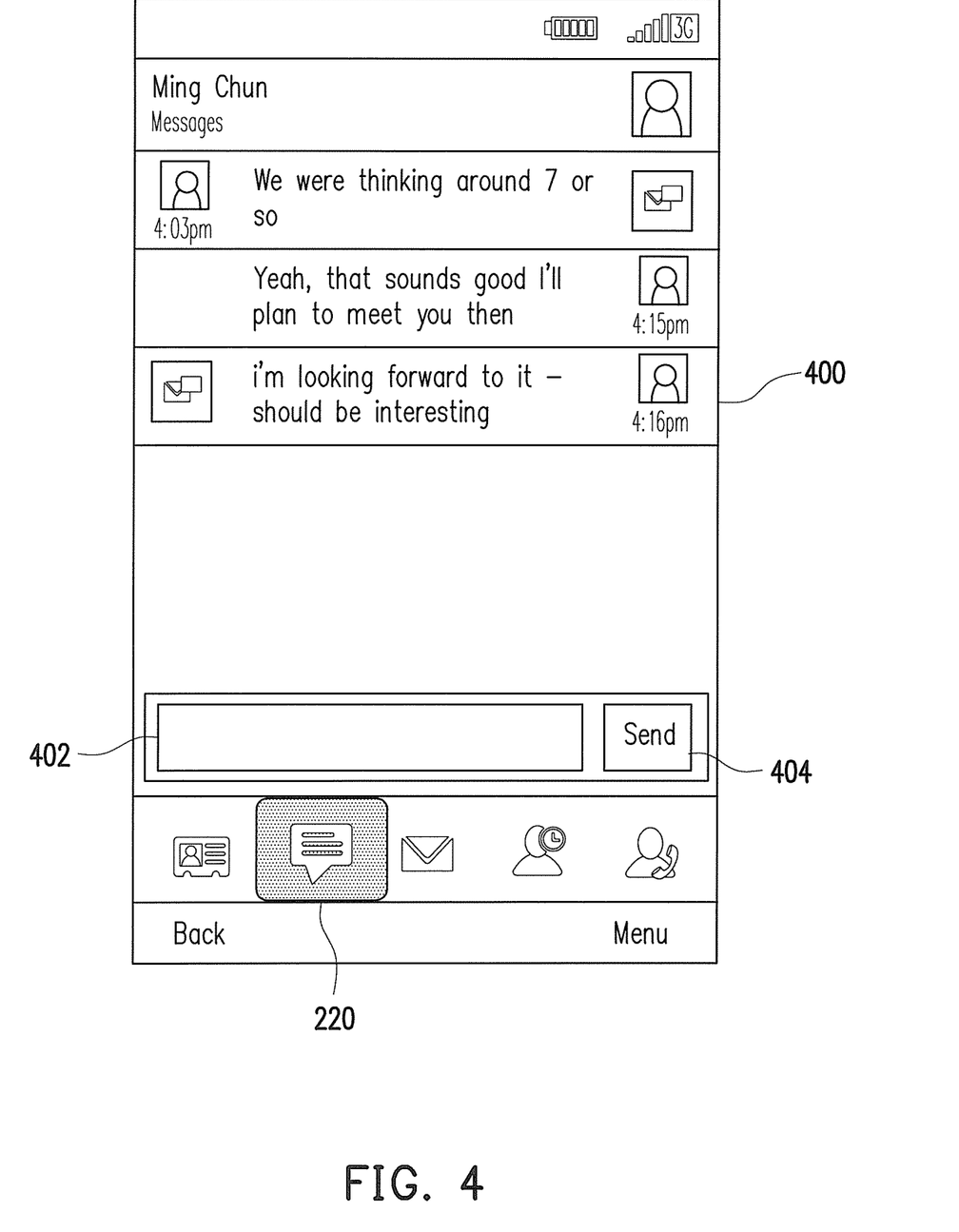
FIG. 4 illustrates an example of a short message display interface according to an example of the present application.

When the user clicks the "Messages" button 220 in the user interface 200, the communication device displays a user interface 400 as shown in FIG. 4. The user interface 400 displays all the messages sent between the user of the communication device and the current caller, and a message input block 402 and a "Send" button 404 are displayed on the lower portion of the user interface 400. The user can send a message to the caller by simply inputting a message in the message input block 402 and then clicking the "Send" button 404.

Figure 5:
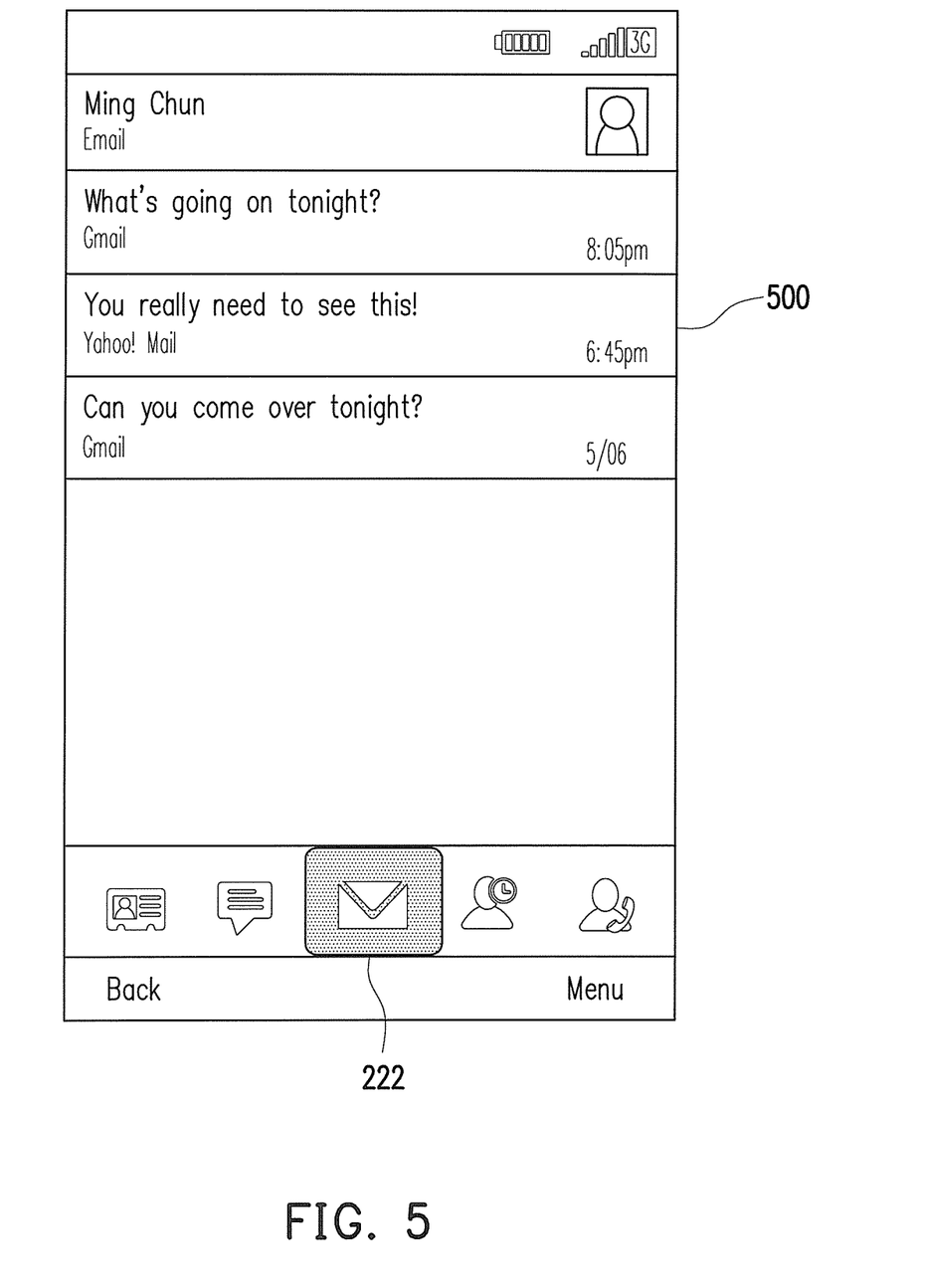
FIG. 5 illustrates an example of an e-mail display interface according to an example of the present application.

When the user clicks the "Email" button 222 in the user interface 200, the communication device displays a user interface 500 as shown in FIG. 5. The user interface 500 displays e-mail addresses of all e-mail accounts of the current caller, wherein the origins of the e-mail accounts are also displayed.

Figure 6:
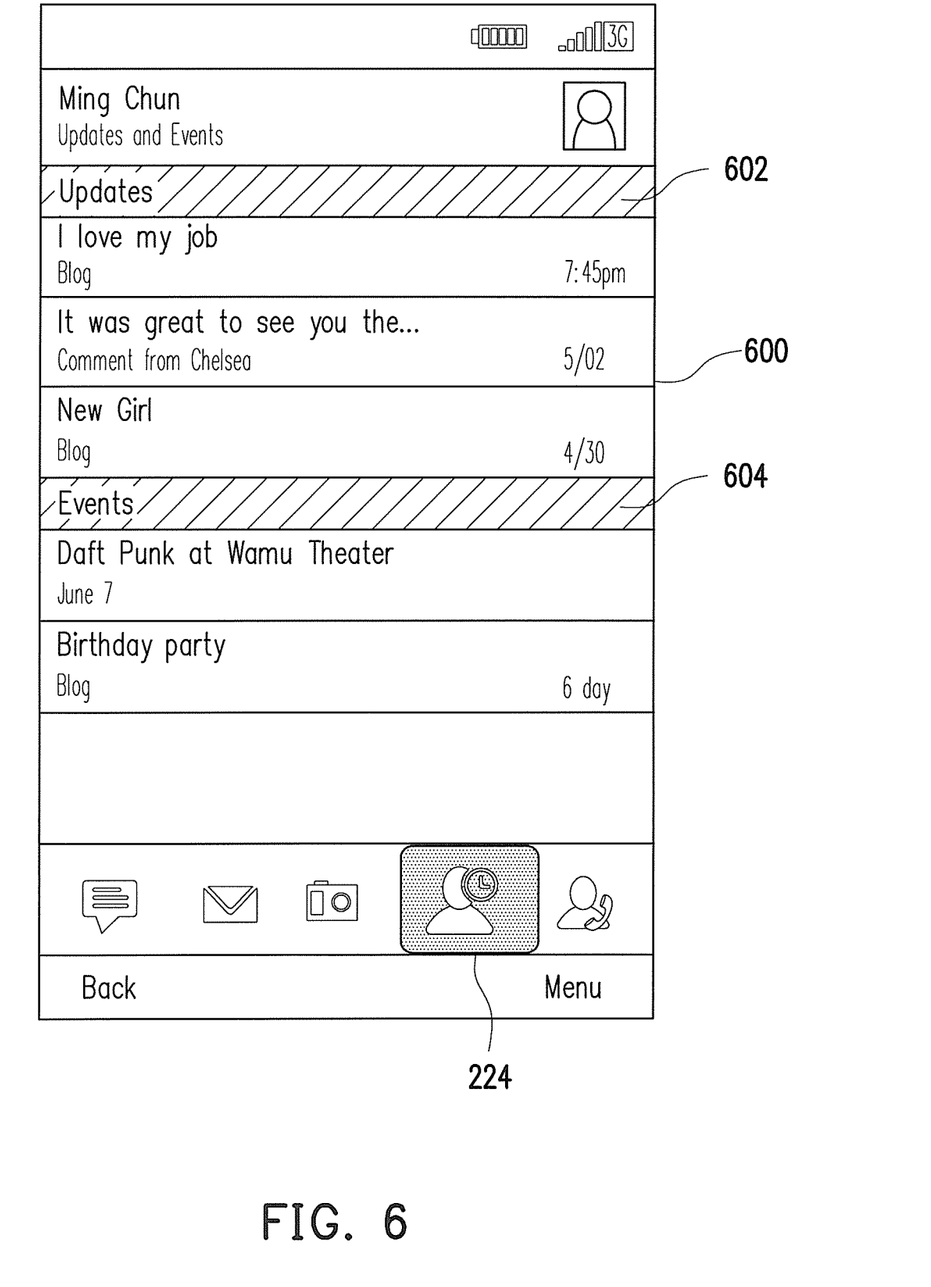
FIG. 6 illustrates an example of a social information display interface according to an example of the present application.

When the user clicks the "Updates and Events" button 224 in the user interface 200, the communication device displays a user interface 600 as shown in FIG. 6. The user interface 600 displays updates and events of the current caller, such as a Facebook update 602 (for example, blog updates) and a Facebook event 604 (for example, a birthday reminder or an anniversary reminder).

Figure 7:
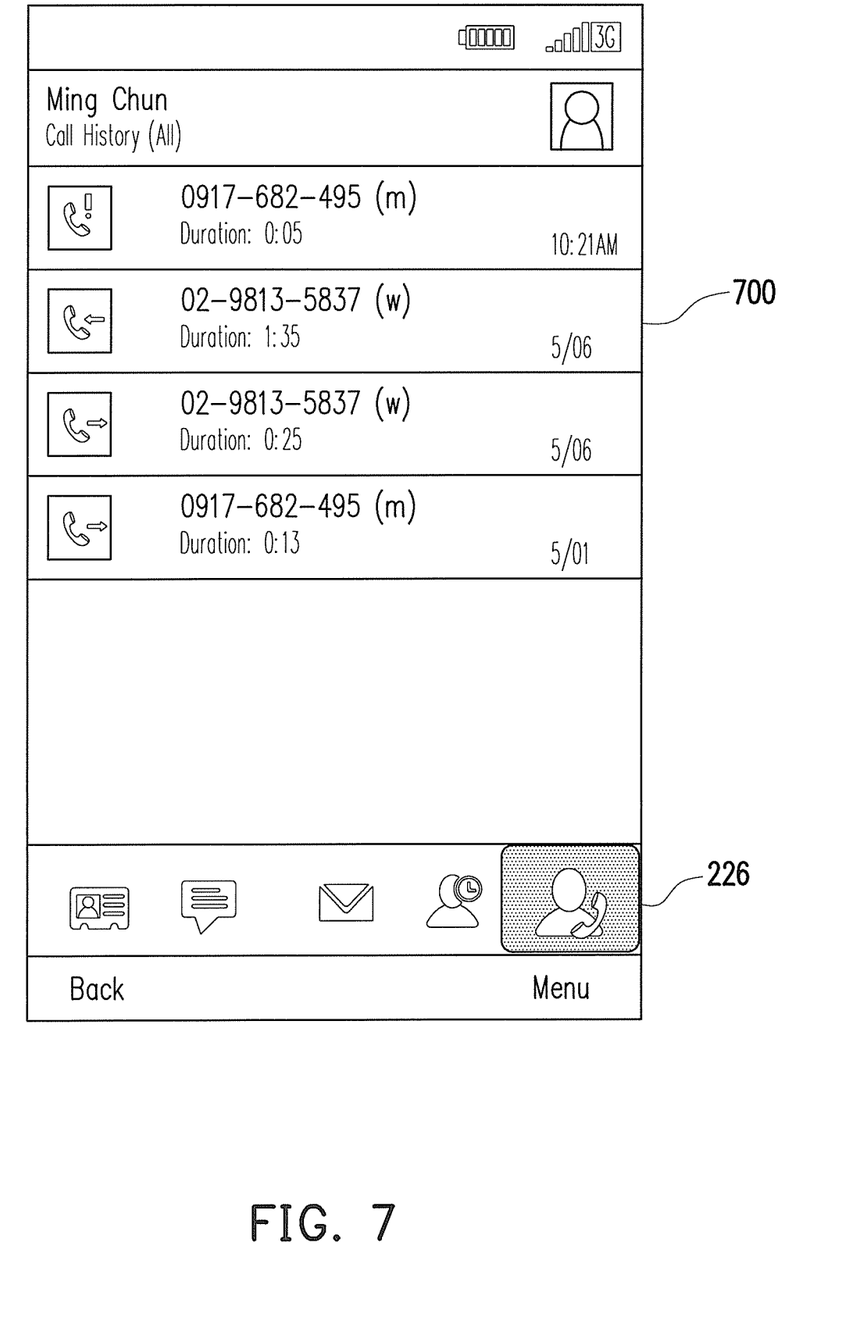
FIG. 7 illustrates an example of a call history display interface according to an example of the present application.

When the user clicks the "Call History" button 226 in the user interface 200, the communication device displays a user interface 700 as shown in FIG. 7. The user interface 700 displays all the calls (comprising dialled calls, received calls, or missed calls, etc.) made between the user of the communication device and the current caller.

Through the caller information displaying method described above, the user of the communication device can click the corresponding on-screen button to obtain the desired caller information instantly when the user is making a phone call.

The present application also provides a hardware device corresponding to the caller information displaying method described above such that the caller information displaying method can be applied to different devices, such as a cell phone, a smart phone, a PDA phone, or an in-vehicle computer, etc. Below, the hardware device provided by the present application will be described with reference to another example of the present application.

Figure 8:
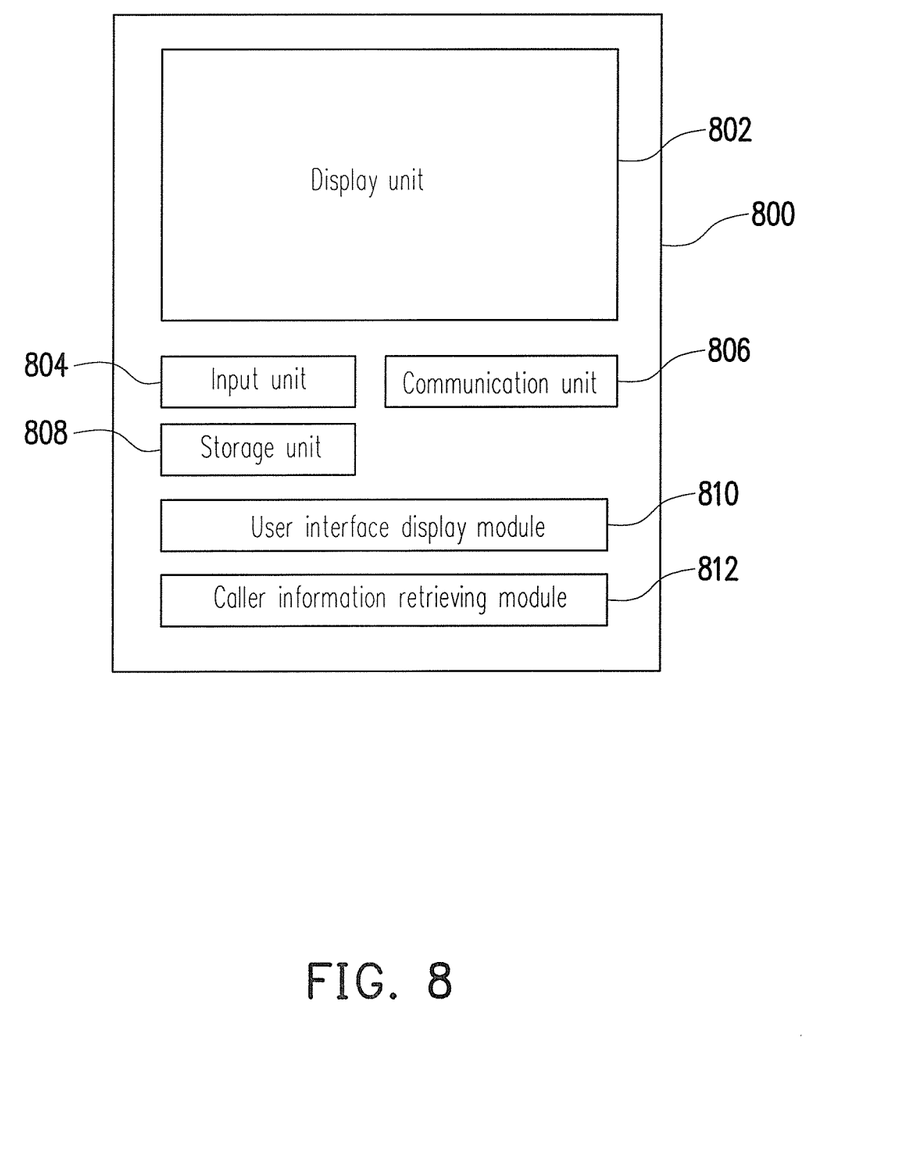
FIG. 8 is a block diagram of a communication device according to an example of the present application.

FIG. 8 is a block diagram of a communication device according to an example of the present application. Referring to FIG. 8, in the present example, the communication device 800 may be a cell phone, a smart phone, a PDA phone, or an in-vehicle computer and which comprises a display unit 802, an input unit 804, a communication unit 806, a storage unit 808, a user interface displaying module 810, and a caller information retrieving module 812. Below, the functions of foregoing components will be respectively described.

The display unit 802 may be a liquid crystal display (LCD) for displaying images of the communication device. The input unit 804 may be a keyboard, a mouse, or a touch panel, and which receives operations performed by a user to the communication device, so as to control the communication device to execute corresponding functions. It should be mentioned that the display unit 802 and the input unit 804 may be integrated into a touch screen (for example, a capacitive or a resistive touch screen) for receiving touch actions performed by a user.

The communication unit 806 may be a wireless communication device of the Global System for Mobile Communication (GSM) system, the Personal Handy-phone System (PHS), or the Wireless fidelity (Wi-Fi) system, and is used for receiving incoming calls or making phone calls through a wireless communication network.

The storage unit 808 is a data storage medium (for example, a hard disk or a memory) and used for storing caller information, such as personal information, short messages, e-mail addresses, social information, and call histories of the callers.

The user interface displaying module 810 displays a user interface of a communication mode on the display unit 802 when the communication device is in the communication mode. Besides displaying the name, phone number, photo of the caller, and on-screen buttons corresponding to basic functions (for example, a "Hold" button, an "Add Call" button, a "Note" button, a "Mute" button, a "Speaker" button, a "Calendar" button, a "Keypad" button, and an "End Call" button), the user interface also displays at least one on-screen button corresponding to a caller information displaying function, wherein these on-screen buttons are respectively corresponding to different types of caller information, such as personal information, a short message list, an e-mail list, social information, and a call history of the caller. These on-screen buttons and their functions have been described in foregoing example and therefore will not be described herein.

When the input unit 804 receives a selecting operation performed by the user to one of the on-screen buttons displayed by the user interface displaying module 810, the caller information retrieving module 812 retrieves caller information associated with the caller according to the selected on-screen button, and the user interface displaying module 810 displays the retrieved caller information on the display unit 802. To be specific, the caller information retrieving module 812 identifies the phone number or other identification information of the caller and then retrieves the caller information associated with the caller in the storage unit 808 according to the identification information.

The present application further provides a recording medium which records a computer program to be loaded into a mobile device to execute the caller information displaying method described above. The computer program product is composed of a plurality of program instructions (for example, an organization chart establishing program instruction, a table approving program instruction, a setting program instruction, and a deployment program instruction, etc), and these program instructions are loaded into the communication device and executed by the same to accomplish various steps in the caller information displaying method and various functions of the communication device described above.

As described above, the present application provides a method and a communication device for displaying caller information, and a recording medium, wherein when a user of the communication device is making a phone call, at least one on-screen button corresponding to different types of caller information is displayed on the screen such that the user can instantly acquire desired caller information. Thereby, communication is made very convenient.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A caller information displaying method, suitable for a mobile communication device comprising a touch screen, the caller information displaying method comprising:
   receiving an incoming call and transforming the mobile communication device into a communication mode;
   identifying a caller of the incoming call during the communication mode;
   displaying a user interface in the communication mode, wherein the user interface comprises at least one on-screen button corresponding to a caller information displaying function;
   receiving an operation performed on the at least one on-screen button during the communication mode; and
   in response to the operation, displaying caller information during the communication mode, wherein the step of displaying the caller information during the communication mode comprises:
   if the operation is corresponding to a social information display function, displaying an update or an event of social information of the caller from a social information service in the communication mode; and
   if the operation is corresponding to an album display function, displaying an album of the caller provided by the social information service in the communication mode.

2. The caller information displaying method according to claim 1, wherein the step of retrieving the caller information according to the operation performed on the at least one on-screen buttons comprises:
   identifying the caller to generate identification information; and
   retrieving the caller information associated with the caller in the mobile communication device according to the identification information.

3. The caller information displaying method according to claim 2, wherein the identification information comprises a phone number of the caller, and the caller information comprises a short message list displaying at least one part of a message content of each short message.

4. The caller information displaying method according to claim 1, wherein the caller information-comprises one or a combination of personal information, a short message list, an e-mail list, social information, and a call history of the caller.

5. The caller information displaying method according to claim 4, wherein the personal information comprises one or a combination of a name, a phone number, an address, a company name, a photo, an e-mail address, a birthday, a personal website link.

6. The caller information displaying method according to claim 4, wherein the e-mail list comprises e-mails of all e-mail accounts of the caller.

7. The caller information displaying method according to claim 1, wherein the social information comprises one or a combination of Facebook update, Facebook event, website update, album update, birthday reminder, and anniversary reminder.

8. The caller information displaying method according to claim 1, wherein the mobile communication device comprises a cell phone, a smart phone, a personal digital assistant (PDA) phone, or an in-vehicle computer, the at least one on-screen button comprises a send button, and the method further comprises:
   when the send button is triggered, sending a short message to the caller during the communication mode.

9. A mobile communication device, comprising:
   a display unit;
   a touch input unit, for receiving an operation from a user;
   a communication unit, coupled to the touch input unit, for receiving an incoming call and establishing a communication to allow the mobile communication device to enter a communication mode when the touch input unit receives a communication operation;
   a user interface displaying module, coupled to the display unit and the communication unit, for displaying a user interface on the display unit in the communication mode, wherein the user interface comprises at least one on-screen button corresponding to a caller information displaying function;
   a caller information retrieving module, coupled to the touch input unit and the user interface displaying module for identifying a caller of the incoming call during the communication mode; and
   a storage unit, for recording caller information,
   wherein when the touch input unit receives an operation performed on the at least one on-screen button during the communication mode, the user interface displaying module displays the caller information on the display unit in response to the operation during the communication mode,
   wherein if the operation is corresponding to a social information display function, the user interface displaying module displays an update or an event of social information of the caller from a social information service in the communication mode, and if the operation is corresponding to an album display function, the user interface displaying module displays an album of the caller provided by the social information service in the communication mode.

10. The mobile communication device according to claim 9, wherein the caller information retrieving module identifies the caller to generate identification information and retrieves the caller information in the storage unit according to the identification information.

11. The mobile communication device according to claim 10, wherein the identification information comprises a phone number of the caller, and the caller information comprises a short message list displaying at least one part of a message content of each short message.

12. The mobile communication device according to claim 9, wherein the caller information-comprises one or a combination of a personal information, a short message list, an e-mail list, the social information and a call history of the caller.

13. The mobile communication device according to claim 12, wherein the personal information comprises one or a combination of a name, a phone number, an address, a company name, a photo, an e-mail address, a birthday, a personal website link.

14. The mobile communication device according to claim 12, wherein the e-mail record comprises e-mails of all e-mail accounts of the caller.

15. The mobile communication device according to claim 9, wherein the social information comprises one or a combination of Facebook update, Facebook event, website update, album update, birthday reminder, and anniversary reminder.

16. The mobile communication device according to claim 9, wherein the communication unit comprises one or a combination of a Global System for Mobile Communication (GSM) device, a Personal Handy-phone System (PHS) device, a Wireless fidelity (Wi-Fi) device, a Worldwide Interoperability for Microwave Access (WiMAX) device.

17. The mobile communication device according to claim 9 comprising a cell phone, a smart phone, a PDA phone, or an in-vehicle computer.

18. A non-transitory recording medium, recording program instructions for:
receiving an incoming call and transforming a mobile communication device into a communication mode;
identifying a caller of the incoming call during the communication mode;
displaying a user interface in the communication mode, wherein the user interface comprises at least one on-screen button corresponding to a caller information displaying function;
displaying a user interface comprising the at least one on-screen button during the communication mode;
receiving an operation performed on the at least one on-screen button during the communication mode; and
in response to the operation, displaying caller information during the communication mode, wherein the program instruction of displaying the caller information during the communication mode comprises:
if the operation is corresponding to a social information display function, displaying an update or an event of social information of the caller from a social information service in the communication mode; and
if the operation is corresponding to an album display function, displaying an album of the caller provided by the social information service in the communication mode.

19. A caller information display apparatus, comprising:
a display means for displaying a user interface in a communication mode, wherein the user interface comprises at least one on-screen button corresponding to a caller information displaying function;
a touch input means for receiving an operation performed on the at least one on-screen button during the communication mode; and
a retrieving means for identifying a caller of an incoming call during the communication mode and in response to the operation, outputting caller information to the display means for displaying during the communication mode,
wherein if the operation is corresponding to a social information display function, the display means displays an update or an event of social information of the caller from a social information service in the communication mode, and if the operation is corresponding to an album display function, the display means displays an album of the caller provided by the social information service in the communication mode.

20. The mobile communication device according to claim 9, wherein the at least on on-screen button comprises a send button, and when the send button is triggered, a short message to the caller is sent to the caller during the communication mode.

* * * * *